United States Patent [19]

Jaw et al.

[11] Patent Number: 5,473,710
[45] Date of Patent: Dec. 5, 1995

[54] CONTROLLED TAPERED ANGLE ETCHING PROCESS FOR FABRICATING OPTICAL INTEGRATED CIRCUITS

[75] Inventors: Ten-Hsing Jaw, Hsingchu; Chao-Fu Hong, Taipei; Ching-Yi Wu, Hsingchu, all of Taiwan

[73] Assignee: Industrial Technology Research Institute, Hsinchu, Taiwan

[21] Appl. No.: 134,420

[22] Filed: Oct. 8, 1993

[51] Int. Cl.⁶ ..................................................... G02B 6/12
[52] U.S. Cl. .............................. 385/14; 385/43; 385/129
[58] Field of Search .................................. 385/14, 8, 43, 385/48, 129, 130, 131, 132

[56] References Cited

U.S. PATENT DOCUMENTS

| | | | |
|---|---|---|---|
| 3,610,727 | 10/1971 | Ulrich | 385/130 X |
| 3,948,583 | 4/1976 | Tien | 385/14 |
| 4,672,382 | 8/1988 | Husain et al. | 385/14 X |
| 4,772,787 | 9/1988 | Trommer | 385/14 X |
| 5,006,906 | 4/1991 | Deri | 385/14 X |
| 5,173,955 | 12/1992 | Yamanishi et al. | 385/8 X |

*Primary Examiner*—John D. Lee
*Assistant Examiner*—Phan Thi Heartney
*Attorney, Agent, or Firm*—Bo-In Lin

[57] ABSTRACT

The present invention discloses an OIC fabrication system which includes a tapered angle computing means for computing a tapered angle for aching a required coupling efficiency. The fabrication system also includes a fabrication control means which includes a tabulated fabricating parameter database for determining and controlling a plurality of fabricating parameters. The fabrication system also includes an etching system which receives a plurality of control signals from the fabrication controlling means to carry out the etching process to form a tapered etching angle such that the optical coupling efficiency can be achieved.

10 Claims, 7 Drawing Sheets

CONTROLLED TAPERED ANGLE ETCHING PROCESS FOR FABRICATING OPTICAL INTEGRATED CIRCUITS

BACKGROUND OF THE INVENTION

1. Field of the Invention

This invention relates generally to the fabrication process for making tapered etching edges and to the application of this fabrication process to manufacture electro-optical devices. More particularly, this invention relates to the fabrication process by utilizing a controlled etching technique for controlling the tapered angle of a layer formation for constructing an optical integrated circuits (OICs).

2. Description of the Prior Art

Application of integrated circuit (IC) technology to the fabrication of electro-optical devices, or generally referred to the optical integrated circuit (OIC) technology often limited by a low coupling efficiency of the optical devices fabricated by the OIC technology.

In the past decade, developments in the integrated circuit (IC) technology have resulted in the fabrication of electronic devices with increasing number of layers, smaller dimensions and more complex electric connections. More recently, IC technology for integrating large number of electronic devices on a silicon chip has increasingly been applied to the manufacture of electro-optical devices. Development of optical technology is greatly benefited because a wide variety of compact and durable optical devices are made available by the use of the optical integrated circuit (OIC) technology.

Optical systems comprise many electro-optical devices to perform combination of functions are often made with thin film technique. Usually, the laser diode light source is integrated with functional components such as switches, modulators, photo diode detectors, and waveguides. By the use modern IC technology, all these components can now be integrated on one common OIC chip. Integration of these optical devices on one chip has the advantages that the optical system is more compact and has stable construction and thus more durable. Configuration stability of these OIC systems can greatly enhance the operability and application of these optical systems. Complicate procedures to re-adjust the relative position of individual optical devices for optical alignment on several optical axes and calibration of optical intensity as a function of system configuration are no longer necessary. OICs can also withstand higher degrees of mechanical vibrations and temperature variations. Because of their compact construction and small size, the OICs can be more conveniently placed without the demand of large volumes thus may be suitable for broader variety of applications.

One of the commonly used OICs is a 'quasi-hybrid' type which comprises laser diode made from a semiconductor coupled to a silicon based OIC which has a combination of photo diode and wave guide network formed on the silicon substrate. For this type of optical systems, a $SiO_2$ buffer layer formed on the silicon substrate is often used as a wave guide because of its small index of refraction. Additionally, a layer of higher index material for guiding the light wave can be conveniently formed by applying the well known technique of sputtering on a buffer layer. Generally, the guiding layer composed of higher index material is also coupled to a light-sensitive detection area in the substrate for transmitting the light wave thereto. In order to serve the function as a coupler for light wave transmission, the buffer layer must be formed with a precise tapered thickness to form a coupler window. This type of coupler is generally referred to as a tapered buffer layer coupler.

However, one limitation in the use of OIC devices is the loss of light intensity when the light is transmitted through the tapered buffer layer couplers. There appear to be a correlation between the coupling efficiency and the tapered angle. However, the correlation was not clearly defined and the intensity and the light path of the radiation transmission in this type of OIC devices are not well understood and controlled. The development of OIC technology is therefore limited due to this limitation.

The buffer layer near the coupler window must have precise tapered angle to direct and control the wave transmission through these couplers. Additionally, a loss of light intensity often occurs in transmitting the light through the tapered layer near the coupler window, the efficiency of the wave guide is a function of the tapered angle. A coupling efficiency of more than 90% can be achieved when the tilted angle of the tapered buffer layer is less then five degrees. In order to achieve high coupling efficiency, there is need in the field of OIC manufacture to develop the technique for making the precisely controlled tapered angle of less than five degrees.

The aforementioned limitation is not easily resolved even though the techniques for making tapering edges of different kinds in the process of IC fabrication are well known in the art. Many prior art techniques are available for making tapered angle in forming various IC layers. As early as 1972, R. C. Turnbull disclosed in the article entitled 'Tapering Metallurgy Edges' (IBM Technical Disclosure Bulletin, Vol. 15 No. 5, October 1972) a method for forming a tapered edge in fabricating aluminum interconnection metallurgy consists of subtracting etching of blanket aluminum layer employing a KTFR photoresist, an Eastman Kodak's trade secret material. A 'subtractive' etching technique is disclosed by Turnball in forming this metallurgy side wall. However, the usefulness of this technique is heavily dependent on the etching solution and the underlined material involved in the etching process. The subtractive etching technique as disclosed by Turnball provides a generalized concept. For application to OIC manufacture, techniques are still to be developed to increase the light wave coupling efficiency in a well defined and controlled manner.

Shahar et al. disclose in U.S. Pat. No. 4,938,841 a method for producing a sloped surface in a semiconductor material. A 'dynamic' mask is applied to an area where a slope is to be developed and then a standard mask is applied over the dynamic mask. The manufactured sample which has to be etched is immersed in the etchant where the standard mask is not appreciably etched while the dynamic mask is progressively etched thus developing a gradual slope along the etched edges. Similarly, in another U.S. Patent, i.e., U.S. Pat. No. 4,484,987 by Keyser, entitled 'Etching Method' (issued on Nov. 27, 1984), an etching technique is disclosed to develop layered materials to produce features with beveled edges. An anisotropic etch is employed to form wells with vertical walls wherein a double mask of a photoresist layer on an underlying thin film is used to define the limits of the anisotropic and isotropic etches. All these techniques disclose method about the making of beveled edges or the formation of sloped surfaces. However, these techniques do not provide definite method and controllable processes to improve the coupling efficiency such that the difficulties in applying the OIC technology to the fabrication of the optical systems may be resolved.

Therefore, there is still a need in the art of applying the

OIC technology to the fabrication of optical systems. First, a clearly defined correlation between the coupling efficiency and the tapered angle of the buffer layer near the coupler window must be established. Secondly, a technique for making such angle in a controllable manner for achieving high coupling efficiency must be developed. These tasks have to be achieved before the difficulties encountered in the prior art can be resolved.

SUMMARY OF THE PRESENT INVENTION

It is therefore an object of the present invention to provide a fabrication process and a method for applying the OIC technology to the fabrication of the optical systems and to properly use the systems in order to overcome the aforementioned difficulties encountered in the prior art.

Specifically, it is an object of the present invention to provide a structure and fabrication process for the OIC optical system wherein the correlation between the light wave coupling efficiency and the structure configuration is clearly defined.

Another object of the present invention is to provide a fabrication method to produce the structure feature of a tapered buffer-layered coupler such that high coupling efficiency may be achieved.

Another object of the present invention is to provide a controllable fabrication method to produce the structure feature of a tapered buffer layer and wave guide coupler in an OIC manufactured optical system to precisely control the coupling efficiency and the manufactured characteristics of the OIC systems.

Briefly, in a preferred embodiment, the present invention comprises an OIC device which comprises a substrate, at least one buffer layer formed on top of the substrate and at least one wave guide layer formed on top of the buffer layer wherein a tapered window is formed on the buffer layer such that a tapered profile is formed on the wave guide layer over the tapered window and the tapered profile have an ascending angle approximately twelve degrees or under.

In another preferred embodiment, the present invention comprises an OIC fabrication system which includes a tapered angle computing means for computing a tapered angle for aching a required coupling efficiency. The fabrication system also includes a fabrication control means which includes a tabulated fabricating parameter database for determining and controlling a plurality of fabricating parameters. The fabrication system also includes an etching system which receives a plurality of control signals from the fabrication controlling means to carry out the etching process to form a tapered etching angle such that the optical coupling efficiency can be achieved.

It is an advantage of the present invention that it provides a fabrication process and a method for applying the OIC technology to the fabrication of the optical systems and to properly use the systems in order to overcome the aforementioned difficulties encountered in the prior art.

Another advantage of the present invention is that it provides a structure and fabrication process for the OIC optical system wherein the correlation between the light wave coupling efficiency and the structure configuration is clearly defined.

Another advantage of the present invention is that it provides a fabrication method to produce the structure feature of a tapered buffer-layered coupler such that high coupling efficiency may be achieved.

Another advantage of the present invention is that it provides a controllable fabrication method to produce the structure feature of a tapered buffer layered coupler in an OIC manufactured optical system to precisely control the coupling efficiency and the manufactured characteristics of the OIC systems.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
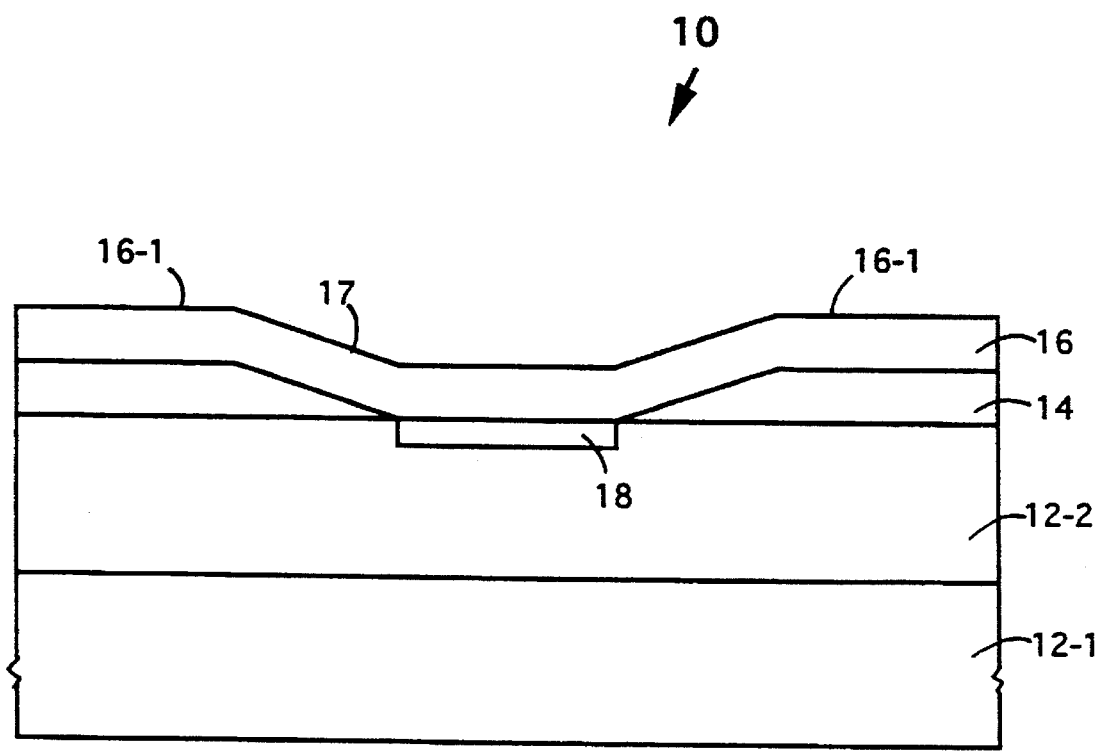
FIG. 1 is a structure diagram of an OIC wave guide photo diode device.

FIG. 1 is a structure diagram of an OIC wave guide photo diode device 10 which has a multi-layer structure supported by a $N^+$ substrate 12 at the bottom. Because of a relative high refractive index, e.g., 3.75 for a silicon substrate 12, a buffer layer 14 which typically comprises a silicon di-oxide ($SiO_2$) layer with a refractive index of 1.46 is used between the substrate 12 and the wave guide layer 16 typically is a glass layer with a refractive index slightly greater than the buffer layer 14, e.g., a Corning Glass #7059 wave guide layer with a refractive index of 1.53. The wave guide layer 16 has a tilted portion 17 which forms a tilted angle θ relative to the horizontal top surface of the substrate 12. In a preferred embodiment, the substrate includes two regions, i.e., a bottom n-region 12-1 and a top i-region 12-2. The tilted angle θ is formed between the waveguide layer 16 and the top surface of the i-region 12-2. The tilted portion 17 can guide the optical wave to a optical sensing means 18, e.g., a photo diode device, disposed near the bottom of the tilted portion 17. The optical sensing means 18 receives the optical wave transmitted through the tilted portion 17 of the wave guide layer 16 to generate responsive electronic signals corresponding to the transmitted optical signals. An object of the present invention is to clearly define the coupling efficiency of the optical wave transmission between the leveled portion of the wave guide layer 16 and the tilted portion 17 as the function of the tilted angle θ and to devise a controllable manufacturing process to precisely fabricate the device 10 with a specific angle θ thus achieving the target coupling efficiency.

Figure 2:
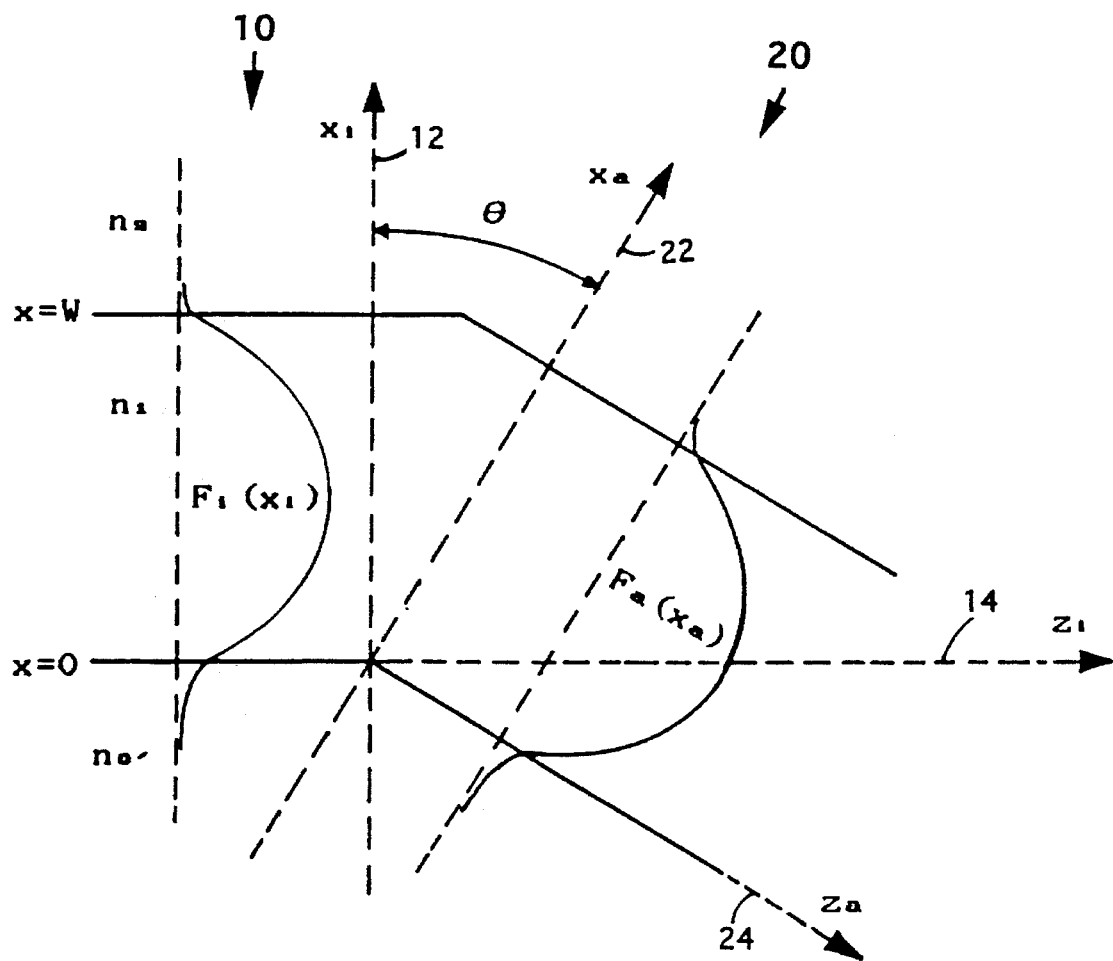
FIG. 2 is a schematic diagram showing the propagation of an electromagnetic wave in a tapered wave guide and the coordinates for computation of the coupling efficiency.

FIG. 2 is a schematic diagram showing the propagation of an electromagnetic wave in the wave guide layer 16 from the leveled section 16-1 to the titled section 17. The spatial and time variations of the electromagnetic wave satisfies the Maxwell equation:

$$\nabla^2 E(r,t) = (n_j^2/C^{(2)})(\partial^2 E/\partial t^2) \quad (1)$$

Where C is the speed of light in the air and $n_j$ is the refractive index and j can have a value of 0',0, 1, 2 to represent the refractive index in the silicon substrate 12, the buffer layer 14, the wave guide layer 16 and the air respectively and the refractive index of the air, i.e., $n_2=1.0$. The electric field E in Equation (1) is a function of position represented by r and time t. For a single frequency wave, a solution for Equation (1) is in the form:

$$E(r,t) = E(r)\exp(-i\omega t) \quad (2)$$

where $\omega$ is the angular frequency. By substituting Equation (2) into Equation (1):

$$\nabla^2 E(r) = -(Kn_j)^2 E(r) \quad (3)$$

where $K=\omega/c$. In a two dimensional analysis and assuming that the wave is a uniform wave propagated along the Z-direction, then $\partial E/\partial y=0$ and $$E(r) = (x,y)\exp(i\beta z) \quad (4)$$

where $\beta$ is the transmissive constant. By substituting Equation (4) into Equation (3):

$$\partial^2 E(x,y)/\partial x^2 + (K^2 n_j^2 - \beta^2)E(x,y) = 0 \quad (5)$$

The electric field function for the guided mode wave in the leveled section 16-1 is denoted as $E_1(X_1)$ and in the titled section 17 is denoted as $Ea(Xa)$ can be obtained by solving Equation (5). In order to compute the coupling efficiency, two coordinate systems are employed one coordinate system $X_1$-$Z_1$ is used for the leveled portion 16-1 of the wave propagation and a second coordinate Xa-Za is used for the titled portion 17. By matching the mode of the electromagnetic wave transmitted in the leveled portion 16-1 and the tilted portion 17, it is assumed that:

$$E_1(X_1) = Ea(Xa) = Ek(Xk) \quad (6)$$

and assuming that $\beta_1 = \beta_a = \beta$, a solution for the electric field is obtained:

$$
\begin{aligned}
E(X_k) &= [\cos(b_1 w) + (Pa/b_1)\sin(b_1 w)]\exp(p_a \cdot Xk) & -\infty \leq Xk \leq 0 \\
&= \cos[b_1(Xk-w)] - (p_2/b_1)\sin[b_1(Xk-w)] & 0 \leq Xk \leq w \\
&= \exp[-p_a(Xk-w)] & Xk \geq w
\end{aligned}
\quad (7)
$$

where $$\beta = kn_j \sin\theta$$

$$b_1 = kn_j \cos\theta$$

$$Pa'^2 = \beta^2 - (kn_{a'})^2$$

$$P2^2 = \beta^2 - (kn_2)^2$$

and w is the thickness of the wave guide layer 18. By normalizing the amplitude of the electric field to be $E=E_1$ and $E_a$ such that the incident wave has a power of 1.0, thus $$E_k = (2\omega\mu)^{1/2} / \left( bk \int_{-\infty}^{\infty} E^2(Xk)dXk \right)^{1/2} \quad (8)$$

Where $k=1$ and $a$, i.e., $E_k$ can be either $E_1$ or $E_a$. Considering also the continuity of the electric fields at the point where $Z_1=0$;

$$
\begin{aligned}
C_1 F_1(x_1) &= C_a F_a(X_a)\exp(i\beta_a Z_a) + E_{rad} \\
&= C_a F(X_1 \cos\theta)\exp(-i\beta X_1 \sin\theta) + E_{rad}
\end{aligned}
\quad (9)
$$

where $E_{rad}$ is the electric filed of the electromagnetic wave in the tilted portion 17 and $C=C_1$, and $C_a=eE$, and e is the amplitude coefficient where $e=e_1=e_a$. If the incident beam has a power of 1, i.e., $e_1=1$, then the normalized output power $P_a=|e_a|^2$. Because of the mode orthogonality relation, i.e., $$\int_{-\infty}^{\infty} E_{rad} F(X) dX = 0 \quad (10)$$

Equation (9) may be solved to obtain the amplitude coefficient in the tilted portion 17 as:

$$e_a = \left\{ \beta^{(1/2)} \int_{-\infty}^{\infty} F_1(X_a/\cos\theta) F_a(X_a)\exp[i\beta_a X_a \tan\theta] dX_a \right\} / \left\{ \beta^{(1/2)} \int_{-\infty}^{\infty} F_1^2(X_1) dX_1 \int_{-\infty}^{\infty} F_a^2(X_a) dX_a \right\}^{(1/2)} = \int_{-\infty}^{\infty} F(X_a/\cos\theta) F(X)\exp[i\beta X \tan\theta] dX \right\} / \int_{-\infty}^{\infty} F^2(X) dX \quad (11)$$

The coupling efficiency of the tilted wave guide layer 16 can be computed as:

$$T = P_d/P_1 = P_a = |e_a|^2 \tag{12}$$

Figure 3:
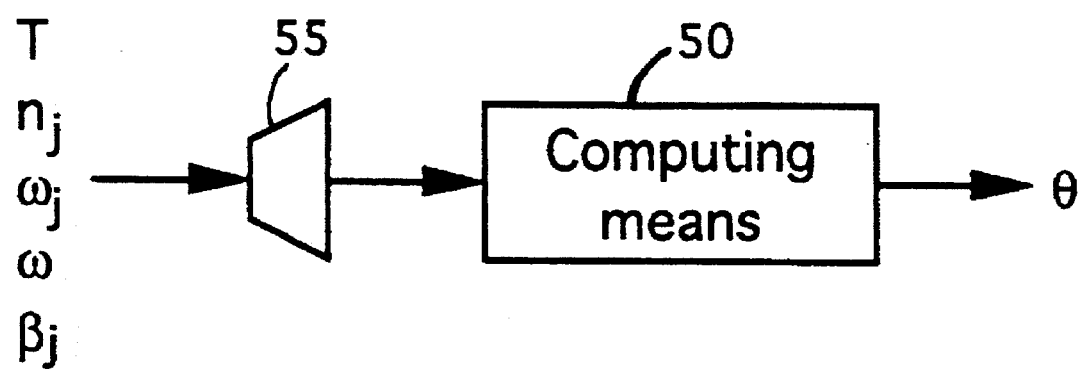
FIG. 3 is a schematic diagram of a computing means for computing the tapered angle as function of the optical coupling efficiency.
Figure 4:
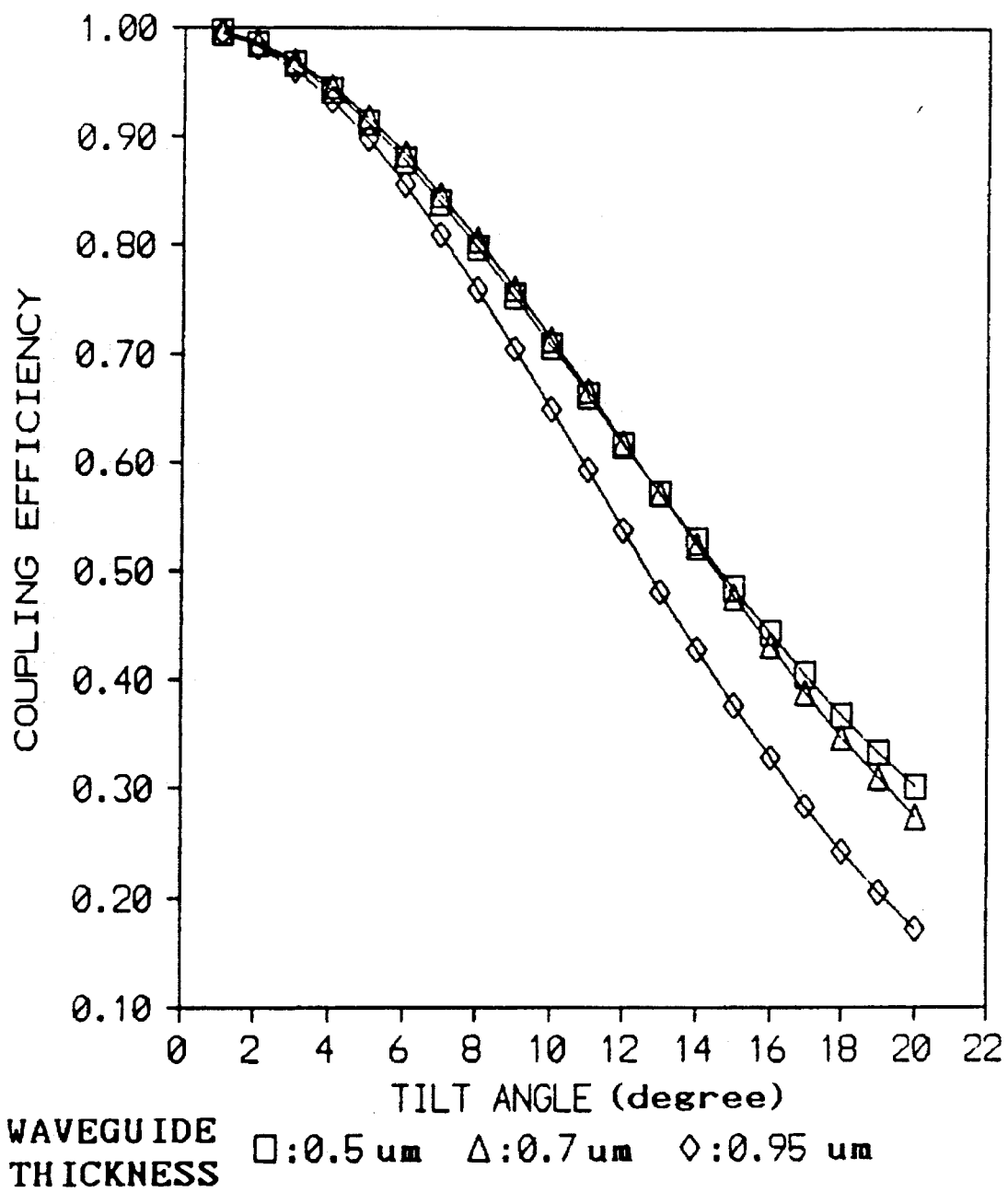
FIG. 4 shows the optical coupling efficiency as function of the tapered angle.

The coupling efficiency T can be calculated by substituting Equation (11) into Equation (12). A correlation between the coupling efficiency T and the titled angle θ can therefore be established, i.e., T=R(θ) and $$\theta = R^{-1}(T) \tag{13}$$

where R and $R_{-1}$ are the transforming and reverse transforming functions for computing the coupling efficiency T as a function of the tilt angle θ. FIG. 3 shows a computing means 50 which performs a reverse transformation operation, i.e., $R^{-1}(T)$ transformation, for computing the tilted angle θ as a function of the coupling efficiency T. Other than the coupling efficiency T, the computing means 50 also receives from an input means 55 the optical and configuration parameters, i.e., the refractive indices $n_j$, for the wave guide layer, the buffer layer, and the substrate layer, the angular frequency ω of the electromagnetic wave, the thickness of the wave guide layer w, and the transmission coefficient β for different layers. For a preferred embodiment as shown in FIG. 1 and 2, FIG. 4 shows the results of computation by the computing means 50 wherein the coupling efficiency T is shown as function of θ for three different values of w, i.e., the layer thickness of the wave guide layer 16 for constant refractive indices and wavelength.

By the use of the computing means 50 as shown in FIG. 3, the coupling efficiency can be precisely determined as a function of the tapered angle when all other design parameters are known. FIG. 4 shows that a coupling efficiency of greater than 90% is achievable for the OIC wave guide photo diode devices when the tapered angle is less than five degrees. In order to achieve high levels of coupling efficiency, it is therefore necessary to control the OIC fabrication processes such that small tapered angle can be formed. Another object of the present invention is to teach a method to precisely control the etching process such that the tapered angles can be formed with predetermined angle whereby high level of coupling efficiency may be achieved.

Figure 5:
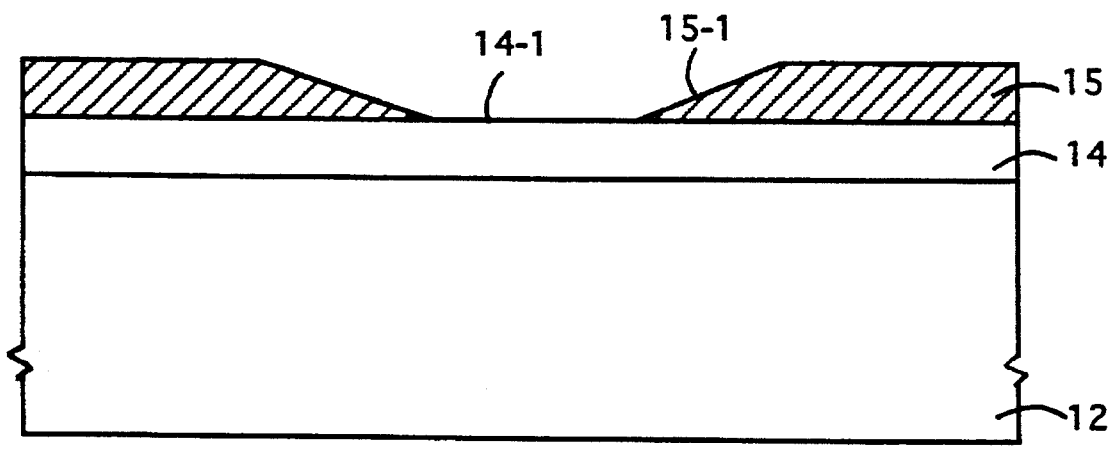
FIG. 5 shows a multi-layer structure of a controlled etching process for making tapered etching angle.

Referring to FIG. 5 which shows the multi-layer structure involved in a controlled etching process for making a tapered etching angle on the buffer layer 14 near the etching window 14-1. In a preferred embodiment, the substrate 12 is a n-type silicon crystal with a crystal phase of <100> where the $SiO_2$ buffer layer 14 is formed by a dry/wet/dry thermal oxidation process. On top of the buffer layer 14, the tapered window area 14-1 is defined by the use of photolithography technique and then prebaked at 120° C. for thirty minutes to remove the moisture. A positive photoresist layer 15 is then coated on top of the buffer layer 14 which has a thickness greater than 2.1 μm. It is then softbaked at 90° C. for twenty minutes and then at 120° C. for twenty five minutes. The tapered window area 15-1 is then exposed to ultraviolet (UV) light for ten seconds and then developed by use of a solution of AZ351 and $H_2O$ at a 1:4 ratio which is then hardbaked at 150° C. for 30 seconds. The chip is then placed for 19 seconds maintained at a constant temperature at 57° C. bathed with two etchants NH4F(40%) and HF(40%) at a 30:1 ratio. The chip is then soaked in an acetone to remove the photoresist layer 15. By the use of this process, a tapered etching angle near the etching window 14-1 of approximately 7° is achieved.

Figure 6:
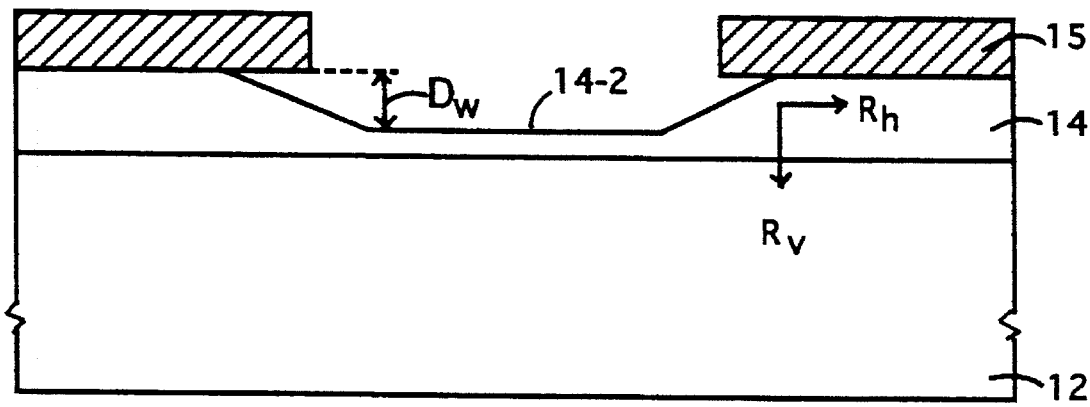
FIG. 6 shows a tapered angle etching window for a controlled etching process.

Referring to FIG. 6 where an etched tapered-angle window 14-2 is shown which has a window depth $D_w$. The window depth $D_w$ is linearly proportional to the etching time. Meanwhile, the etching rate along the horizontal boundary between buffer layer 14 and the photoresist layer 15, which is denoted as $R_h$, is greater than the etching rate in the vertical direction, i.e., $R_v$. This difference in etching rate, i.e., $R_h > R_v$, which is often referenced as the oxide-photoresist interface enhancement factor, is caused by several reasons. The first reason is the change of the micro structure along the oxide-photoresist boundary when there is a built-in stress or departure from stoichiometry in the process of forming the photoresist layer 15 on top of the oxide layer 14. Secondly, the bonding between the oxide layer 14 and the photoresist layer 15 is a physical bonding. Comparing to the chemical bonding between the $SiO_2$ molecules, the physical bonding between layers 14 and 15 is less tightly coupled and thus allows more space for the etchant to diffuse between these layers. This oxide-photoresist enhancement factor thus enables the etching process to make an etching window 14-1 with tapered angles.

The buffer-photoresist enhancement factor is a function of the etching-time ($E_t$), etching temperature ($E_{temp}$), concentration of the etchant solution (C), photoresist material (M) and photoresist thickness (D). The tapered angle θ which is dependent on the enhancement factor can therefore be represented as:

$$\theta = F(E_t, E_{temp}, C, M, D) \tag{14}$$

Figure 7:
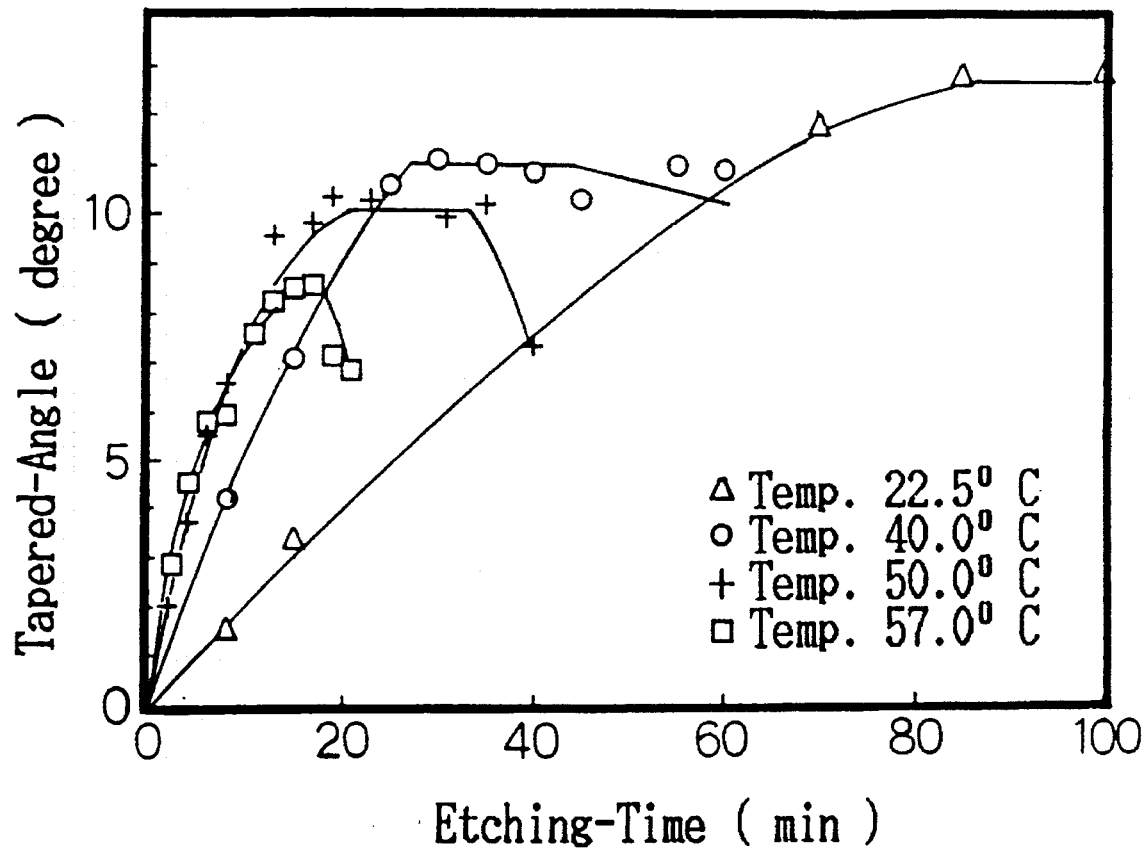
FIG. 7 shows tapered etching angle as function of the etching time and the etching temperature.

For the preferred embodiment as shown in FIG. 5, it is determined that the enhancement factor and consequently, the tapered angle θ has a strong functional relationship with the etching temperature and etching time. FIG. 7 illustrates that the etching angle increases with etching time and decreases with etching temperature. With specific etchant concentration C, photoresist material M and photoresist layer thickness D, the value of the tapered angle can be controlled by adjusting the etching time and etching temperature.

Figure 8:
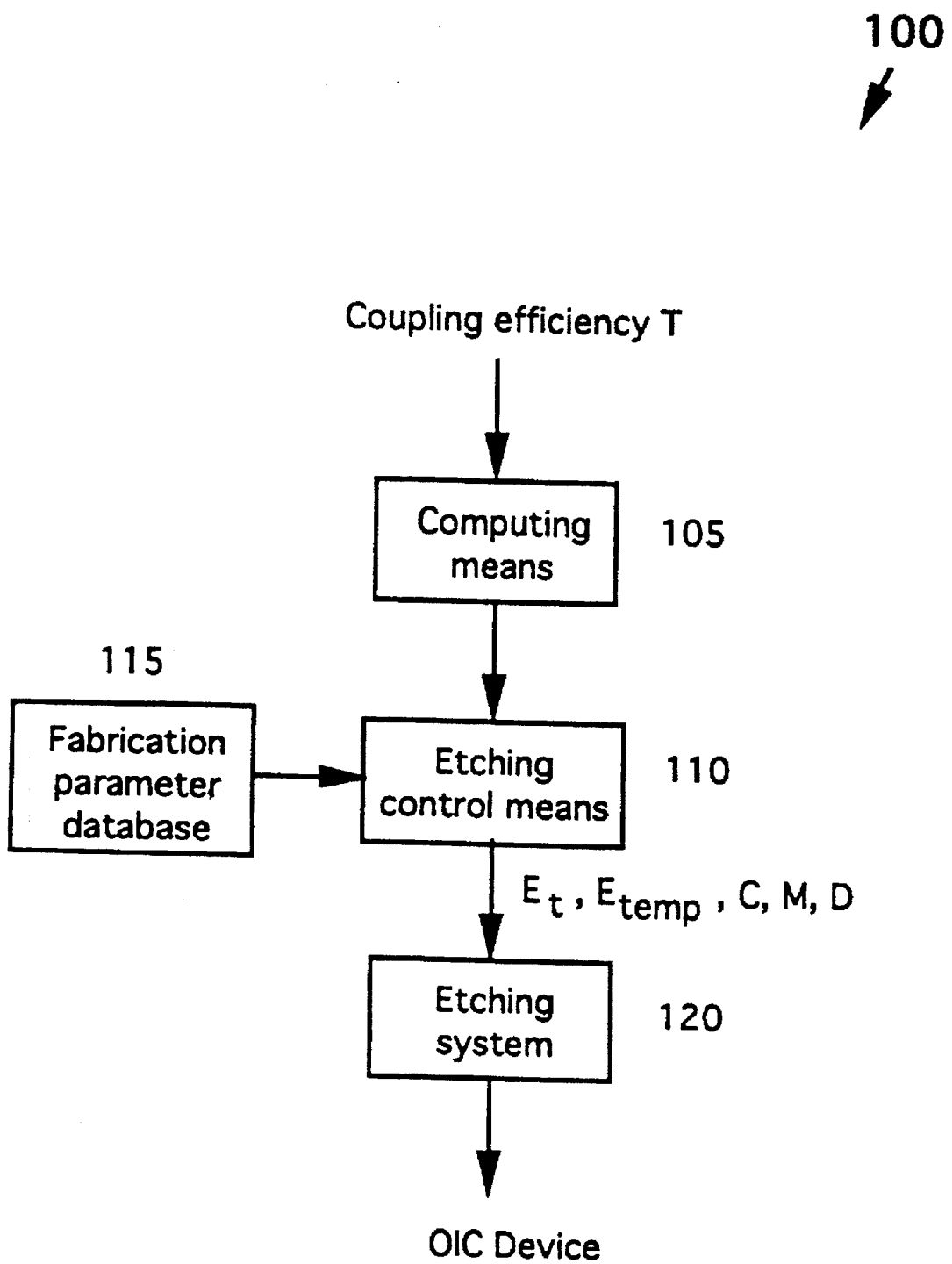
FIG. 8 shows a schematic block diagram of an OIC fabrication system.

By the use of Equation (14) and experimental database tables established by tabulating the data as shown in FIG. 7, FIG. 8 is a block diagram showing an OIC fabrication system 100 to perform a controlled fabrication process for making an OIC device with specific coupling efficiency. A pre-determined coupling efficiency is received by a tapered angle computing means 105 to compute a tapered angle θ by the use of equation 13. The computed angle θ is then inputted to an etching control means 110 which controls the etching process by utilizing Equation (14) with a tabulated fabricating-parameter database 115. The etching control means 110 issues control signals to an etching system 120 to control the etching parameters including the etching-time ($E_t$), etching temperature ($E_{temp}$), concentration of the etchant solution (C), photoresist material (M) and photoresist thickness (D) in order to control the etching process to generate a tapered angle θ. A systematic and controllable fabrication process is therefore disclosed by the use the OIC fabrication system which enables the OIC devices to be fabricated with specific pre-determined coupling efficiency.

The present invention thus discloses, in a preferred embodiment, an OIC device 10 which comprises a substrate 12, at least one buffer layer 14 formed on top of the substrate and at least one wave guide layer 16 formed on top of the buffer layer wherein a tapered window 14-1 is formed on the buffer layer 14 such that a tapered profile is formed on the wave guide layer 16 over the tapered window 14-1 and the tapered profile have an ascending angle θ approximately twelve degrees or under. The OIC device 10 further includes a photo-sensitive responsive means 18 for responding to the optical transmission in the wave guide layer 16 to generate at least a responsive electric signal.

In another preferred embodiment, the present invention comprises an OIC fabrication system 100 which includes a tapered angle computing means 105 for computing a tapered angle for aching a required coupling efficiency. The fabrication system 100 also includes a fabrication control means 110 which includes a tabulated fabricating parameter database 115 for determining and controlling a plurality of fabricating parameters. The fabrication system 100 also includes an etching system 120 which receives a plurality of control signals from the fabrication controlling means 110 to carry out the etching process to form a tapered etching angle θ such that the optical coupling efficiency can be achieved.

In a specific preferred embodiment, the system 100 for fabricating the OIC device 10, the tapered angle computing means 105 applies Equations (1) to Equation (13) to compute the required tapered angle for satisfying the optical coupling efficiency requirement. The etching means 120 performs an etching process on an OIC chip which includes a semiconductor substrate 12 having a top surface, a buffer layer 14 formed on the top surface and a photoresist layer 15 formed on top of the buffer layer 14 defining an etching window 14-1. The fabricating controlling means 110 applies Equation (14) to compute the controlling fabrication parameters. The fabricating controlling means 110 computes an etching temperature and an etching time with a preselected photoresist material, photoresist thickness and etchant concentration. The buffer layer 14 is a silicon dioxide layer, the photoresist layer 15 is a positive photoresist layer having thickness approximately 2.1 μm or greater, the echant is a mixture of two etchants NH4F (40%) and HF(40%) at ratio of approximately 30:1, the etching temperature is controlled at approximately 57° C. for an etching time of approximately 19 minutes for making a tapered angle of approximately 7°. By the use of the above OIC fabrication system 100 and applying the above described processes, a wave guide layer 16 for guiding an optical transmission therein is formed on top of the buffer layer 14 The wave guide layer 16 is a layer of substantially uniform thickness and the buffer layer 14 having a tapered window 14-1 surrounded by a tapered surface forming a tapered angle θ which is approximately twelve degree or less with the top surface of the substrate 12.

The present invention also discloses a method for fabricating an OIC device with a specific optical coupling efficiency. The fabrication method includes the steps of: (a) computing a tapered angle by using the optical coupling efficiency requirement; (b) computing a plurality of controlling fabrication parameters by utilizing the required taper angle and a plurality of fabrication parameters from a database; and (c) performing an etching process by utilizing the controlling parameters to fabricate the OIC with the required tapered angle. In a specific fabrication method disclosed in this invention, step (a) further includes a step of computing the required tapered angle by applying Equations (1) to (13) for satisfying the optical coupling efficiency requirement. In another specific fabrication method, the step (c) further includes a step of performing an etching process on an OIC chip which includes a semiconductor substrate 12 having a top surface, a buffer layer 14 formed on the top surface and a photoresist layer 15 formed on top of the buffer layer 15 defining an etching window 14-1. In another specific fabrication method, the step (b) further includes a step of applying Equation (14) to compute the controlling fabrication parameters. In yet another specific fabrication method step (b) further includes a step of computing an etching temperature and an etching time with a preselected photoresist material, photoresist thickness and etchant concentration, and, step (c) further includes a step of performing an etching process on the OIC chip by controlling the etching temperature at approximately 57° C. for an etching time of approximately 19 minutes for making a tapered angle of approximately 7° on wherein the buffer layer is a silicon dioxide layer, the photoresist layer is a positive photoresist layer having thickness approximately 2.1 μm or greater and the etchant is a mixture of two etchants NH4F (40%) and HF(40%) at ratio of approximately 30:1. In yet another specific fabrication method, it further includes a step (d) forming a wave guide layer of substantially uniform thickness on top of the buffer layer for guiding an optical transmission therein.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A system for fabricating an OIC device with specific optical coupling efficiency requirement comprising:

a tapered angle computing means for receiving said optical coupling efficiency requirement (T) to compute a required tapered angle θ according to an equation:

$$\theta = R^{-1}(T)$$

where $R^{-1}$ is a reverse transforming function derived from a set of electromagnetic wave transportation equations;

a fabricating controlling means utilizing said required tapered angle and a plurality of functional dependence data of said tapered angle relating to a plurality of fabrication parameters from a database wherein said tapered angle θ being represented as a function of an etching time ($E_t$), an etching temperature, ($E_{temp}$), a concentration of the etchant solution (C), a photoresist material (M), and a photoresist thickness (D) as:

$$\theta = F(E_t, E_{temp}, C, M, D)$$

said etching means performs an etching process on an OIC chip which includes a semiconductor substrate having a top surface, a buffer layer formed on said top surface and a photoresist layer formed on top of said buffer layer defining an etching window; and said buffer layer being a silicon dioxide layer, said photoresist layer is a positive photoresist layer having thickness approximately 2.1 μm or greater, said etchant is a mixture of two etchants NH4F(40%) and HF(40%) at ratio of approximately 30:1, said etching temperature is controlled at an approximate range from 22.5° to 57° C. for an etching time of approximately nine to sixty minutes for making a tapered angle of ranging approximately from 7° to 12°.

2. The system for fabricating OIC device as recited in claim 1 wherein:

said etching means further forming, on top of said buffer layer, a wave guide layer for guiding an optical transmission therein wherein said wave guide layer being a layer of substantially uniform thickness.

3. A system for fabricating an OIC device with specific optical coupling efficiency requirement comprising:

an etching means for performing an etching process on an OIC chip which including a semiconductor substrate having a top surface, a buffer layer formed on said top surface, a photoresist layer formed on top of said buffer layer defining an etching window;

a tapered angle computing means for receiving said optical coupling efficiency requirement T to compute a required tapered angle θ according to an equation:

$$\theta = R^{-1}(T) \quad (13)$$

where $R^{-1}$ is a reverse transforming function derived from a set of electromagnetic wave transportation equations;

a fabricating controlling means utilizing said required tapered angle from said tapered angle computing means and a plurality of functional dependence data of said tapered angle relating to a plurality of fabrication parameters from a database for computing a plurality of controlling fabrication parameters;

said etching means further receiving said plurality of controlling fabrication parameters and for performing an etching process utilizing said controlling parameters to fabricate said OIC with said etching windowed formed with said required tapered angle.

4. The system for fabricating OIC device as recited in claim 3 wherein:

said etching means further forming, on top of said buffer layer, a wave guide layer for guiding an optical transmission therein wherein said wave guide layer being a layer of substantially uniform thickness.

5. The system for fabricating OIC device as recited in claim 4 wherein:

said fabricating controlling means computes said tapered angle θ as function of an etching time ($E_t$), an etching temperature, ($E_{temp}$), a concentration of the etchant solution (C), a photoresist material (M), and a photoresist thickness (D) as:

$$\theta = F(E_t, E_{temp}, C, M, D).$$

6. A method for fabricating an OIC device with a specific optical coupling efficiency requirement comprising the steps of:

(a) computing a tapered angle θ by using said optical coupling efficiency requirement T according to an equation:

$$\theta = R^{-1}(T) \quad (13)$$

where $R^{-1}$ is a reverse transforming function derived from a set of electromagnetic wave transportation equations;

(b) computing a plurality of controlling fabrication parameters by utilizing said required tapered angle and a plurality of functional dependence data of said tapered angle relating to a plurality of fabrication parameters from a database; and (c) performing an etching process by utilizing said controlling parameters to fabricate said OIC including a semiconductor substrate having a top surface, a buffer layer formed on said top surface and a photoresist layer formed on top of said buffer layer defining an etching window with said required tapered angle.

7. The method for fabricating OIC device as recited in claim 6 wherein:

said step (c) of performing said etching process further including a step of forming, on top of said buffer layer, a wave guide layer for guiding an optical transmission therein wherein said wave guide layer being a layer of substantially uniform thickness.

8. The method for fabricating OIC device as recited in claim 7 wherein:

said step (b) of computing a plurality of controlling fabrication parameters further including s a step of computing said tapered angle θ as function of an etching time ($E_t$), an etching temperature, ($E_{temp}$), a concentration of the etchant solution (C), a photoresist material (M), and a photoresist thickness (D) as:

$$\theta = F(E_t, E_{temp}, C, M, D).$$

9. A method for fabricating an OIC device with a specific optical coupling efficiency requirement comprising the steps of:

(a) computing a tapered angle θ by using said optical coupling efficiency requirement T according to an equation:

$$\theta = R^{-1}(T) \quad (13)$$

where $R^{-1}$ is a reverse transforming function derived from a set of electromagnetic wave transportation equations;

(b) computing a plurality of controlling fabrication parameters by utilizing said required tapered angle and a plurality of functional dependence data of said tapered angle relating to a plurality of fabrication parameters from a database wherein said tapered angle θ being represented as a function of an etching time ($E_t$), am etching temperature, ($E_{temp}$), a concentration of the etchant solution (C) a photoresist material (M), and a photoresist thickness (D) as:

$$\theta = F(E_t, E_{temp}, C, M, D)$$

(c) performing an etching process to fabricate said OIC including a semiconductor substrate having a top surface, a buffer layer formed on said top surface and a photoresist layer formed on top of said buffer layer wherein said etching process being performed by controlling said etching temperature at approximately 22.5° to 57° C. for an etching time of approximately nine to sixty minutes and said buffer layer being a silicon dioxide layer, said photoresist layer is a positive photoresist layer having thickness approximately 2.1 μm or greater and said etchant is a mixture of two etchants NH4F(40%) and HF(40%) at ratio of approximately 30:1 for making a tapered angle etching widow of approximately 7° to 12° on said OIC chip.

10. The method for fabricating OIC device as recited in claim 9 further including a step of:

(d) forming, on top of said buffer layer, a wave guide layer for guiding an optical transmission therein wherein said wave guide layer being a layer of substantially uniform thickness.

\* \* \* \* \*